United States Patent [19]

Hoban

[11] Patent Number: 5,098,148
[45] Date of Patent: Mar. 24, 1992

[54] PICKUP TRUCK CONVERTIBLE HARDTOP

[76] Inventor: Edward Hoban, 503 Birch Ct., Brick Town, N.J. 08723

[21] Appl. No.: 722,229

[22] Filed: Jun. 27, 1991

[51] Int. Cl.[5] .............................. B60N 1/02
[52] U.S. Cl. .................... 296/66; 296/107; 296/64; 29/401.1
[58] Field of Search ............. 296/107, 124, 125, 63, 296/65.1, 69, 64, 10; 29/401.1

[56] References Cited

U.S. PATENT DOCUMENTS

| | | | |
|---|---|---|---|
| 1,819,545 | 8/1931 | Delp | 296/66 X |
| 3,703,310 | 11/1972 | Lystad | 296/66 X |
| 3,840,263 | 10/1974 | Bowden | 296/64 |
| 4,480,968 | 11/1984 | Koto | 296/190 |
| 4,750,778 | 6/1988 | Hoban | 296/66 |

*Primary Examiner*—Robert R. Song
*Attorney, Agent, or Firm*—Clifford G. Frayne

[57] ABSTRACT

An assembly for the modification of a truck bed of a pickup truck which facilitates the conversion of a two or three seat pickup truck into a four or five seat pickup truck convertible, the assembly comprising a flared extension sidewall adjacent the cab portion which extends the effective width of the truck bed to permit the rotation of the pickup truck cab into the truck bed when the pickup truck cab's lower width dimension is greater than the inner width dimension of the truck bed.

1 Claim, 7 Drawing Sheets

PICKUP TRUCK CONVERTIBLE HARDTOP

FIELD OF INVENTION

The present invention relates to a system which modifies a pickup truck bed section to allow the hardtop to pivot into the truck bed transforming the truck into a convertible.

BACKGROUND OF THE INVENTION

Applicant is the holder of U.S. Pat. No. 4,750,778 for a "Pickup Truck Convertible Hardtop/Jump Seat". The aforesaid patent was directed towards a novel mechanism for the transformation of two or three seat pickup trucks into four or five seat pickup truck convertibles. The thrust of the aforesaid patent was the modification of the cab section of a pickup truck having a pivotable means allowing the cab top to become completely disposed within the truck bed such that it functions as a rearwardly facing jump seat.

The prior art cited by Applicant in the prosecution of the aforesaid patent identified the following U.S. Pat. Nos. 1,047,016 to Elwood; 1,410,139 to Tavelli; 1,766,015 to Dupre; 4,139,232 to Cerf; 4,238,876 to Monroe; 4,335,916 to Gutgsell; 4,480,868 to Koto; 4,595,230 to Russell and 4,623,187 to Ibrahim; none of which, when taken alone or in combination, disclose the specific details of Applicant's prior invention.

The present application is directed towards an improved assembly which provides for certain modifications to the truck bed to accommodate the design of certain pickup truck cabs which are contoured such that the width of the cab at its base where the pivotable means would be secured is slightly wider than the available width of the truck bed, yet the cab is tapered upwardly to its roof line such that the width of the roof is less than the width of the truck bed. Applicant's modifications provide for an accommodation in the sidewalls of the truck bed to allow for the pickup truck cab when structured as aforesaid to still pivot into the truck bed, thus providing for a pickup truck convertible and an optional jump seat.

OBJECTS OF THE INVENTION

An object of the present invention is to provide for a novel assembly that is safe and cost-effective and facilitates the transformation of two or three seat pickup trucks into four or five seat pickup truck convertibles.

Another object of the present invention is to provide for a novel truck bed construction to permit the transformation of a hardtop pickup truck to a convertible pickup truck when the cab of the pickup truck is dimensioned wider than the interior bed of the pickup truck.

Another object of the present invention is to provide for a novel construction which facilitates the transformation from a hardtop pickup truck to convertible pickup truck without undue modification to the truck bed.

SUMMARY OF THE INVENTION

An assembly for the modification of the truck bed of a pickup truck which facilitates the conversion of a two or three seat pickup truck into a four or five seat pickup truck convertible, the cab portion being modified to have a pivotable means secured to the lower rear cab portion and a securing means positioned in the upper front cab portion which, when unsecured, permits the cab portion to pivot rearwardly into the truck bed, the sidewalls of the truck bed immediately adjacent the cab portion being modified with molded extension sidewalls to permit the rotation of the pick-up truck cab into the truck bed when the pickup truck cab's lower width dimension is greater than the inner width dimension of the truck bed.

BRIEF DESCRIPTION OF THE DRAWINGS

The objects and other advantages of the present invention will be more fully understood when taken in conjunction with the drawings wherein.

DETAILED DESCRIPTION OF THE DRAWINGS

Figure 1A:
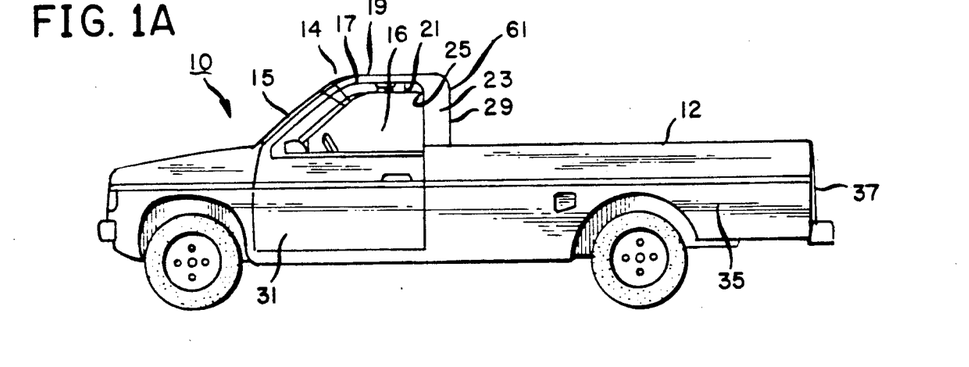
FIGS. 1A, 1B and 1C are a side plan view of a pickup truck illustrating its various parts and the convertibility pursuant to Applicant's prior U.S. patent.
Figure 1B:
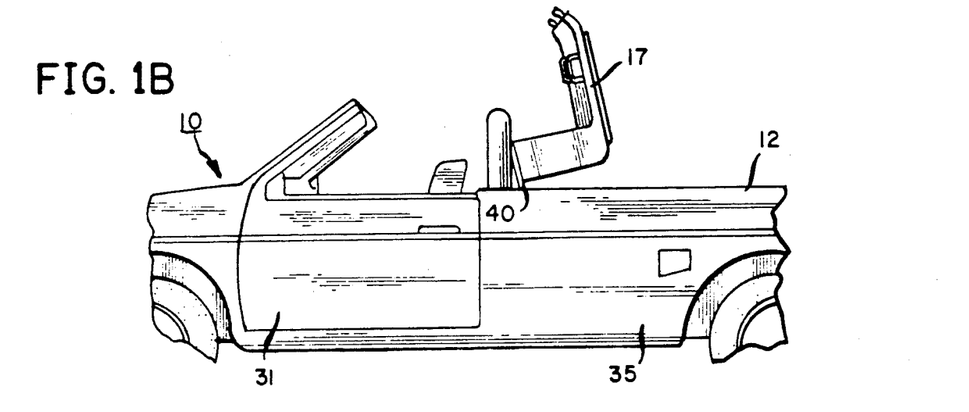
Figure 1C:
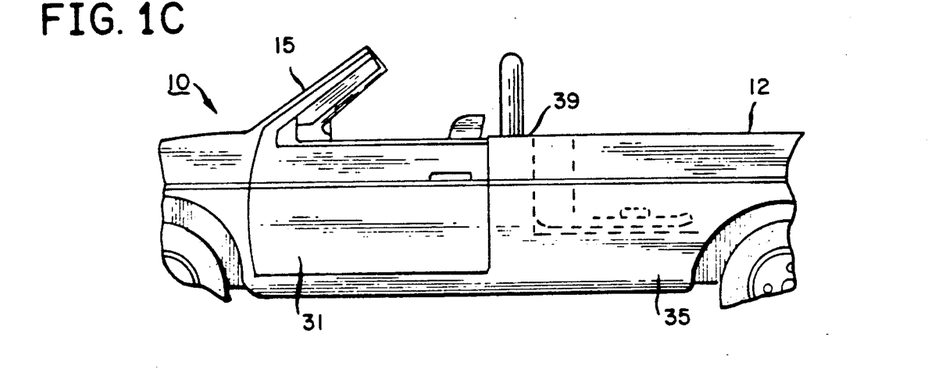

Referring to FIG. 1A, 1B and 1C, there is illustrated a side plan view of a typical pickup truck 10. Pickup truck 10 is comprised of a truck bed portion 12 and a cab portion 14. Cab portion 14 defines the passenger area 16 containing the area for enclosure of driver and passengers. Cab area 14 is defined by a front windshield 15, a roof 17 having an outer surface 19 and an inner surface 21, generally of a horizontal nature, and a rear vertically displaced section 23 having an inner surface 25, an outer surface 27, there being disposed in rear vertically displaced section 23, a window 29. The cab section is further defined by two entry and exit doors 31.

The truck bed 12 is defined by sidewalls 35, a rear drop lid 37, and a front end wall 39 which is in proximate alignment with vertically displaced rear section 23 of cab portion 14. Truck cab 14 and truck bed 12 are normally constructed of rolled steel.

Figure 2:
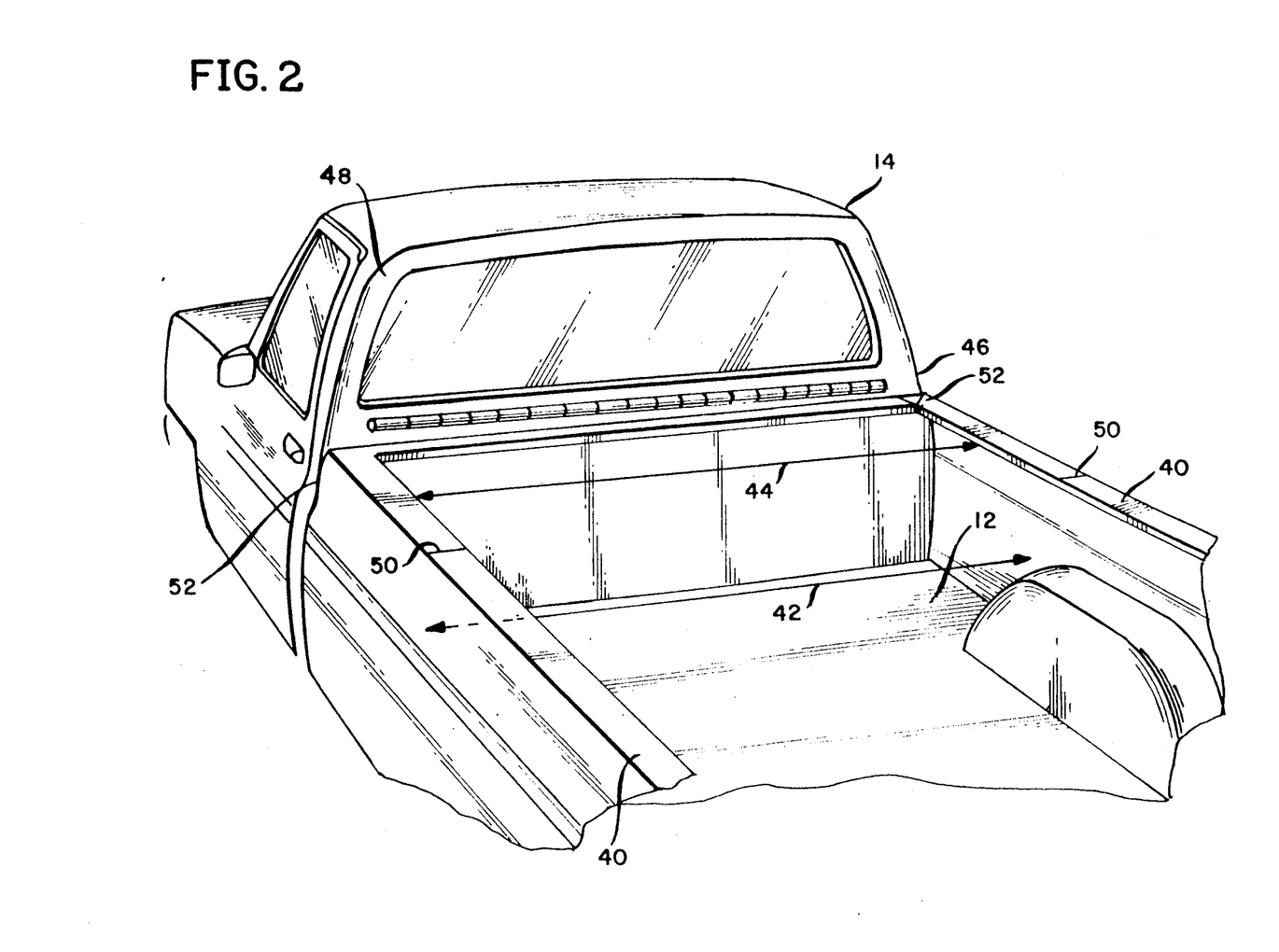
FIG. 2 is a perspective rear view of the pickup truck illustrating the pivotable aspects.

Applicant's prior disclosure in U.S. Pat. No. 4,750,778 detailed the manner in which modifications to truck cab 14 were undertaken in order to permit the roof 16 and rear vertically displaced section 23 to be disengaged from windshield and front portion 15 of cab 14 and pivotly rotated rearwardly into truck bed 12 as particularly illustrated in FIGS. 1B and 1C. FIG. 2 is an illustration of the pivoting means, the structural elements more fully disclosed in the aforesaid patent for transformation of a standard pickup truck into a convertible having a jump seat which Applicant incorporates by reference.

A problem arises with respect to truck cabs which are tapered upwardly and whose lower width is greater than that of the truck bed immediately adjacent vertically displaced surface 23 of cab 14. As illustrated in FIG. 2, in many instances, truck bed 12 will have a horizontally displaced ledge 40 disposed on the top surface of vertical sidewalls 35. Top ledge 40 reduces the effective width 42 of truck bed 12 to an effective width 44, thus when ledge 40 is present, and truck cab 14 is of such a character that its lower section 46 is wider than its upper section 48, Applicant's prior apparatus and method for converting and transforming a pickup truck into a convertible would experience difficulty in the pivoting of truck cab 14 into truck bed 12. This problem is solved with Applicant's molded extension sidewalls which, when positioned as disclosed hereafter, increase the effective width of truck bed 12 immediately proximate to vertically rear displaced surface 23 of truck cab 14 to permit the necessary clearance for the lower portion of truck cab 14 to clear sidewalls 35 and pivotally rotate into truck bed 12 to accomplish the objectives of transforming a pickup truck into a convertible having an optional jump seat.

In addition to Applicant's novel molded extension sidewalls allowing the transformation of a pickup truck into a convertible, the molded extension sidewalls also have application to certain specialty vehicles of the pickup truck variety currently available on the market. Certain manufacturers manufacture a pickup truck with a convertible top, the convertible top being of the canvas and bow structure normally associated with convertible tops. These convertible tops as disclosed hereafter are folded down rearwardly to expose passenger area 16. The design of these canvas and bow convertible tops for pickup trucks results: in their lying in a horizontal position across sidewalls 35 of truck bed 14. This design, in order to adequately cover and protect passenger area 16, does not permit them to be disposed downwardly within truck bed 12. The molded extension sidewalls, which are the subject matter of the present invention, would allow these canvas and bow-type convertible tops for pickup trucks to be disposed downwardly within truck bed 12.

Applicant's modifications to truck bed 12 are first illustrated in FIG. 2. Sidewalls 35 are modified either in the manufacturing stage or by the individual retrofitting Applicant's invention to convert the pickup truck to a convertible. The thrust of the invention is to flare sidewalls 35 immediately adjacent cap portion 14. This is most easily accomplished as illustrated in FIG. 2 by severing ledge 40 at a position 50, position 50 being a distance from vertically displaced section 23 of cab 14 proximate to the height of cab 14. This distance may vary with the degree of cab side angle. A second severing cut 52 is made in ledge 40 immediately adjacent to vertically displaced section 23 of cab 14, severing cut 52 continuing downwardly along vertical sidewall 35.

Figure 3:
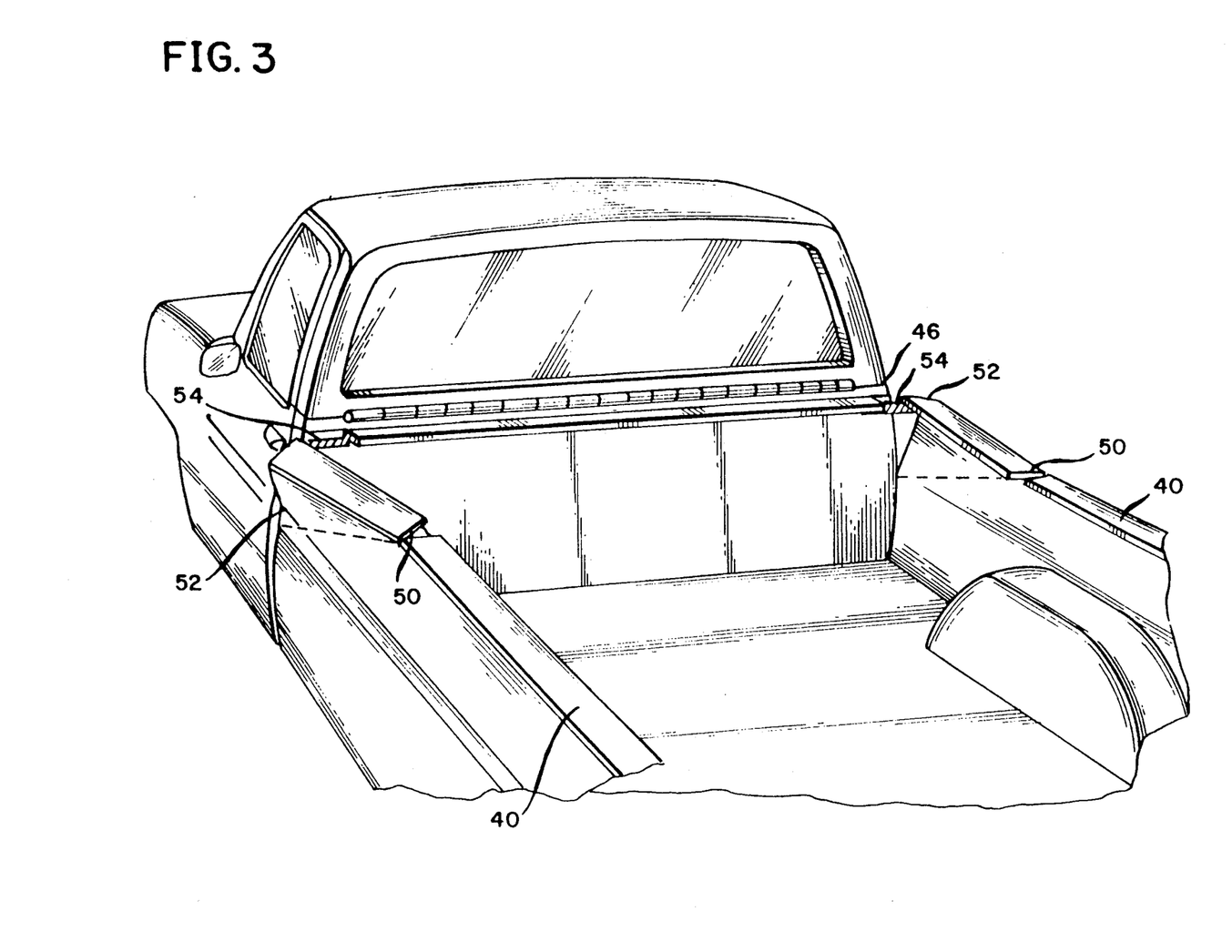
FIG. 3 is a perspective rear view of the pickup truck illustrating the modifications to the sidewalls.

Once severing cuts 50 and 52 have been made, FIG. 3 illustrates the manner in which a portion 53 of sidewall 35 can be flared outwardly creating a greater effective width of truck bed 12 immediately adjacent vertically-displaced section 23 of cab 14. At this point, reinforcing strips 54 are welded or bolted to the ledge to provide additional support.

Figure 4:
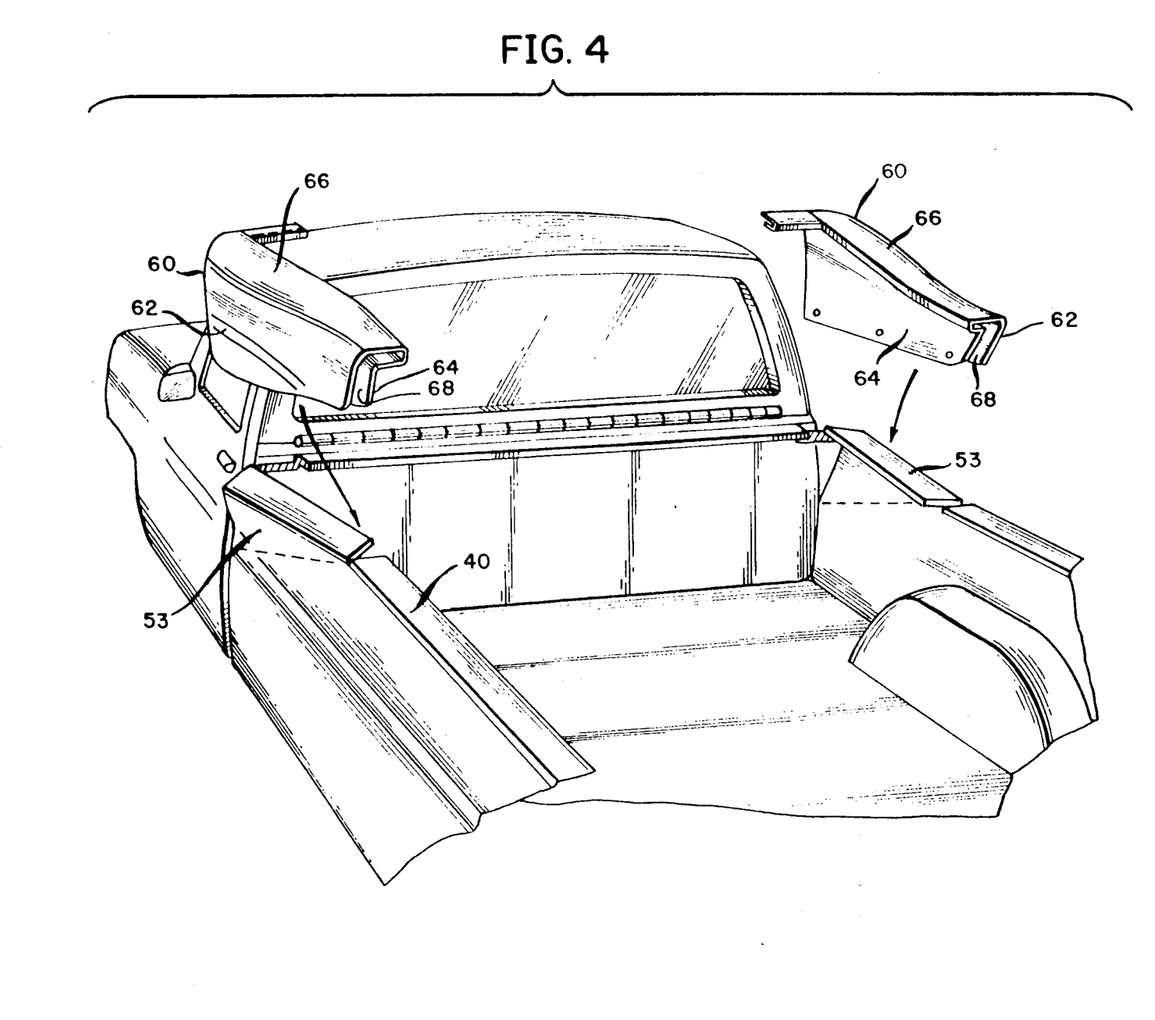
FIG. 4 is a perspective rear exploded view of a pickup truck illustrating the molded extension sidewalls.

Referring to FIG. 4, there is illustrated an exploded view of truck bed 12 illustrating flared sidewall portions 53 positioned after severing cuts 50 and 52 have been made. The effective width of truck bed 12 has been increased immediately adjacent vertically-displaced section 23 of cab portion 14 and it is now necessary to stabilize flared sidewall portions 53 with the remainder of the truck bed.

Molded extension sidewalls 60 are defined by an outer wall 62, an inner wall 64 and a top wall 66. Walls 62, 64 and 66 define a channel 68 which allows molded extension sidewalls 60 to slip over flared sidewall portions 53. Upper wall 66 of molded extension sidewall 60 is designed to cooperate with upper ledge 40 of sidewalls 35 so as to reestablish ledge 40 in its extension to cab 14.

Molded extension sidewall 60 may be comprised of molded plastic, fiberglass or any other suitable material. Similarly, they may be secured in place by either adhesives or bolting.

Figure 5:
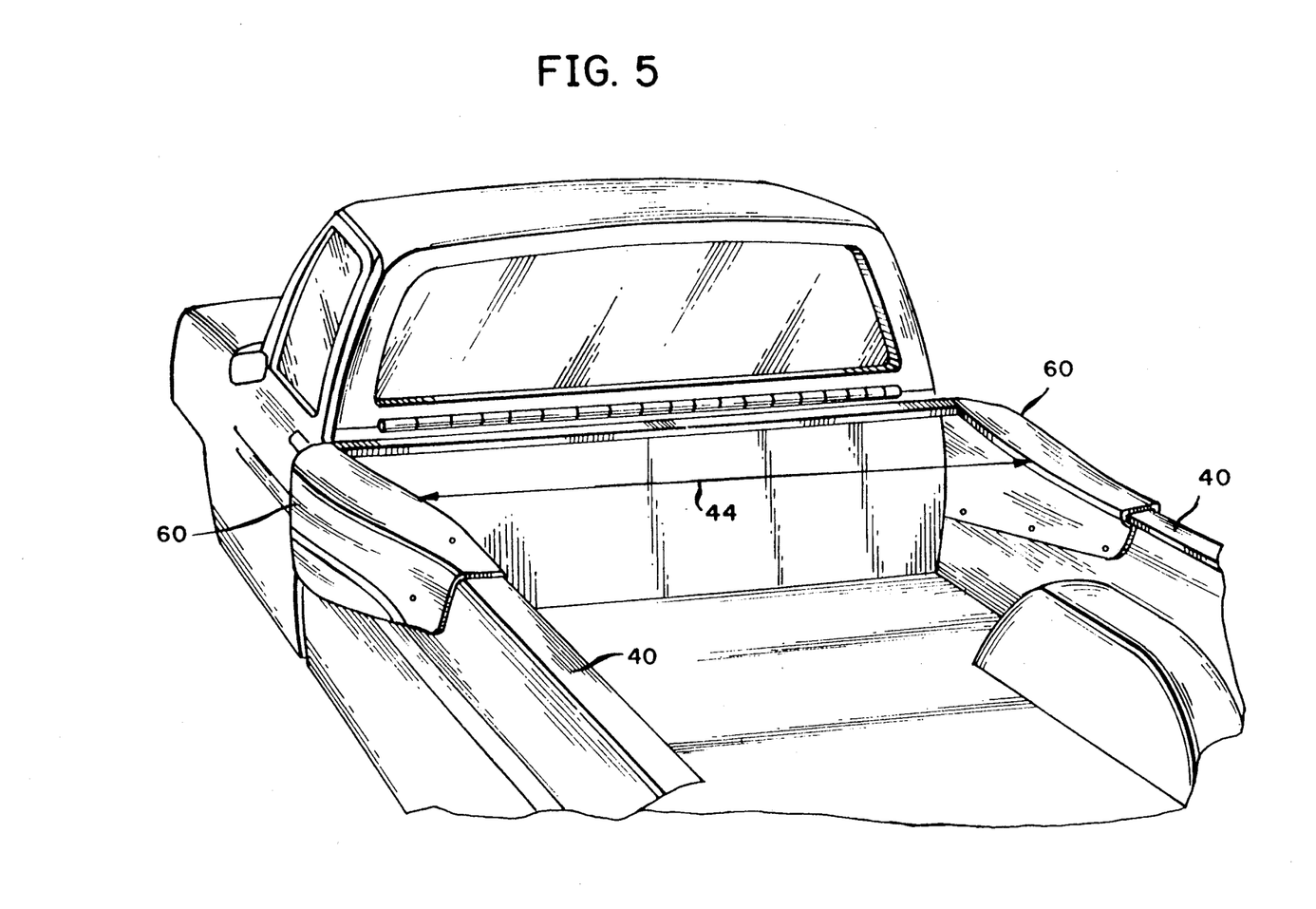
FIG. 5 is a rear perspective view of a pickup truck illustrating the molded extension sidewalls in position.

FIG. 5 is a rear perspective view of truck bed 12 illustrating molded extension sidewalls 60 in position and cooperative with sidewalls 35 and upper ledge 40. In this configuration, the effective width 44 of truck bed 12 immediately adjacent cab 14 has been aesthetically widened to accommodate a truck cab 14 which has a wider base than its top. The rotation and positioning of truck cab 14 into truck bed 12 would be accomplished in a manner identical to that disclosed in U.S. Pat. No. 4,750,778.

Figure 6:
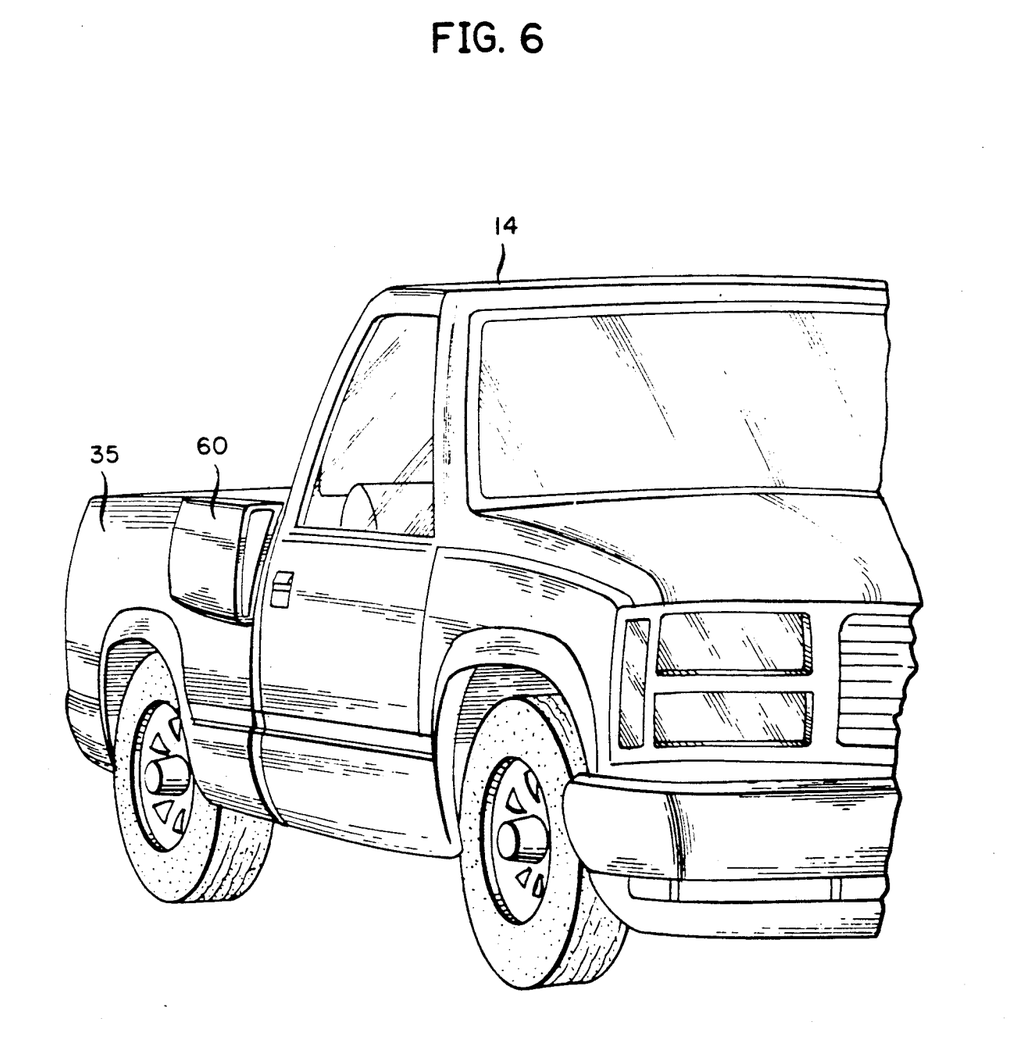
FIG. 6 is a partial front perspective view of a pickup truck showing the cab in an upright position with the molded extension sidewalls in position.

FIG. 6 illustrates a partial front perspective view of pickup truck 10 with molded extension sidewalls 60 positioned on sidewall 35. The design of molded extension sidewall 60 cooperates with sidewalls 35 to cover flared portion 53 of sidewall 35 yet present an aesthetic appearance to the vehicle and still maintain the structural integrity of truck bed 12. As illustrated in FIG. 6, molded extension sidewall 60 is designed in this instance to resemble an air scoop; however, the designs may vary with the configuration of the truck bed.

Figure 7:
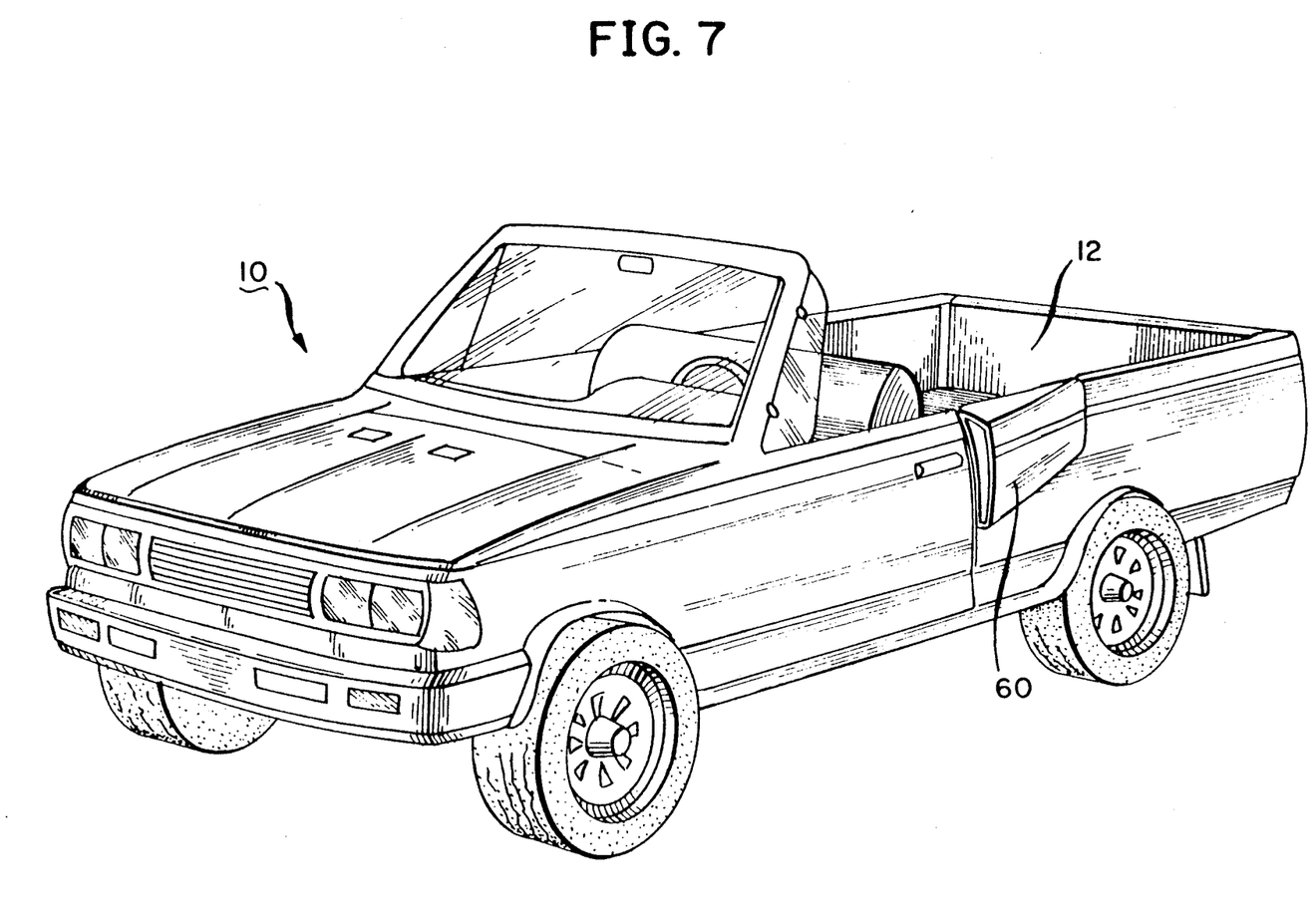
FIG. 7 is a front perspective view of a pickup truck illustrating the molded extension sidewalls with the cab in the pivotally downward position within the truck bed.

Finally, FIG. 7 is again a perspective view of pickup truck 10 illustrating molded extension sidewalls 60 in position with truck cab 14 pivoted rearwardly and downwardly into truck bed 12 thus transforming pickup truck 10 into a convertible.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A modification to the sidewalls of the truck bed of a pickup truck which facilitates the conversion of a two or three seat pickup truck having a modified cab section into a four or five seat pickup truck convertible, wherein said cab section has a pivotable means proximate to the end wall of said truck bed, said pivotable allowing said cab top to become completely disposed within said truck bed, such that it functions as a rearwardly facing jumpseat, the modifications to the sidewalls of the truck bed comprising:

a first horizontal cut made in the horizontal ledge of said sidewall a distance from said cab section of said pickup truck approximately equal to the height of said cab section;

a second horizontal cut in said ledge of said sidewall proximate to said intersection of said cab section and said bed section, said second cut extending vertically downwardly from said horizontal ledge through said vertical sidewall a distance sufficient to displace said sidewall portion between said first cut and second cut outwardly from said truck bed;

a support means having a first end secured to said outwardly-extending portion of said sidewall and a second end secured to said end wall of said truck bed;

a sidewall extension generally U-shaped in cross sectional area having a inner wall and an outer wall secured to a generally horizontal surface. said inner wall and said outer wall and said generally horizontal surface engaged over said outwardly-extending portion of each of said sidewalls of said truck bed, said extension sidewall having a generally planer front face enclosing said outwardly extending sidewall, said generally horizontal surface of said sidewall extension secured to said horizontal ledge of said sidewalls and end wall of said truck bed.

* * * * *